United States Patent [19]

Asaoka et al.

[11] Patent Number: 4,861,450
[45] Date of Patent: Aug. 29, 1989

[54] POWER SUPPLY SYSTEM FOR ELECTROLYTIC PROCESSING APPARATUS

[75] Inventors: Teruo Asaoka, Kakegawa; Shogo Yoshioka, Iwata, both of Japan

[73] Assignee: Shizuoka Seiki Co., Ltd., Shizuoka, Japan

[21] Appl. No.: 188,316

[22] Filed: Apr. 29, 1988

[30] Foreign Application Priority Data

Jul. 7, 1987 [JP] Japan .................. 62-168945

[51] Int. Cl.$^4$ ............................................. B23H 3/02
[52] U.S. Cl. ................... 204/224 M; 204/228; 204/DIG. 9
[58] Field of Search ............ 204/DIG. 9, 224 M, 228, 204/129.43; 219/69 C, 69 P

[56] References Cited

U.S. PATENT DOCUMENTS

| | | | |
|---|---|---|---|
| 3,607,689 | 8/1968 | Inoue | 204/224 M |
| 3,650,940 | 3/1972 | Bardahl | 204/224 M |
| 4,659,894 | 4/1987 | Inoue | 204/224 M |

FOREIGN PATENT DOCUMENTS

| | | |
|---|---|---|
| 60-44228 | 3/1985 | Japan . |
| 60-26646 | 6/1985 | Japan . |
| 60-177819 | 9/1985 | Japan . |
| 61-71921 | 4/1986 | Japan . |

*Primary Examiner*—Donald R. Valentine
*Attorney, Agent, or Firm*—Flynn, Thiel, Boutell & Tanis

[57] ABSTRACT

A power supply system is provided for an electrolytic processing apparatus of the type which has an electrode positioned to oppose a work within an electrolyte and which processes and finishes the work by discharge of at least two modes of pulses of different current densities between the work and the electrode. The power supply system includes a plurality of capacitors capable of discharging charges so as to supply discharge pulses across the work and the electrode, a plurality of discharge swithches connected between the capacitors and the work and adapted to selectively cause the charges from the capacitors to be discharged; and a control section arrangement for selectively turning the discharge switches on and off in accordance with the current densities.

5 Claims, 4 Drawing Sheets

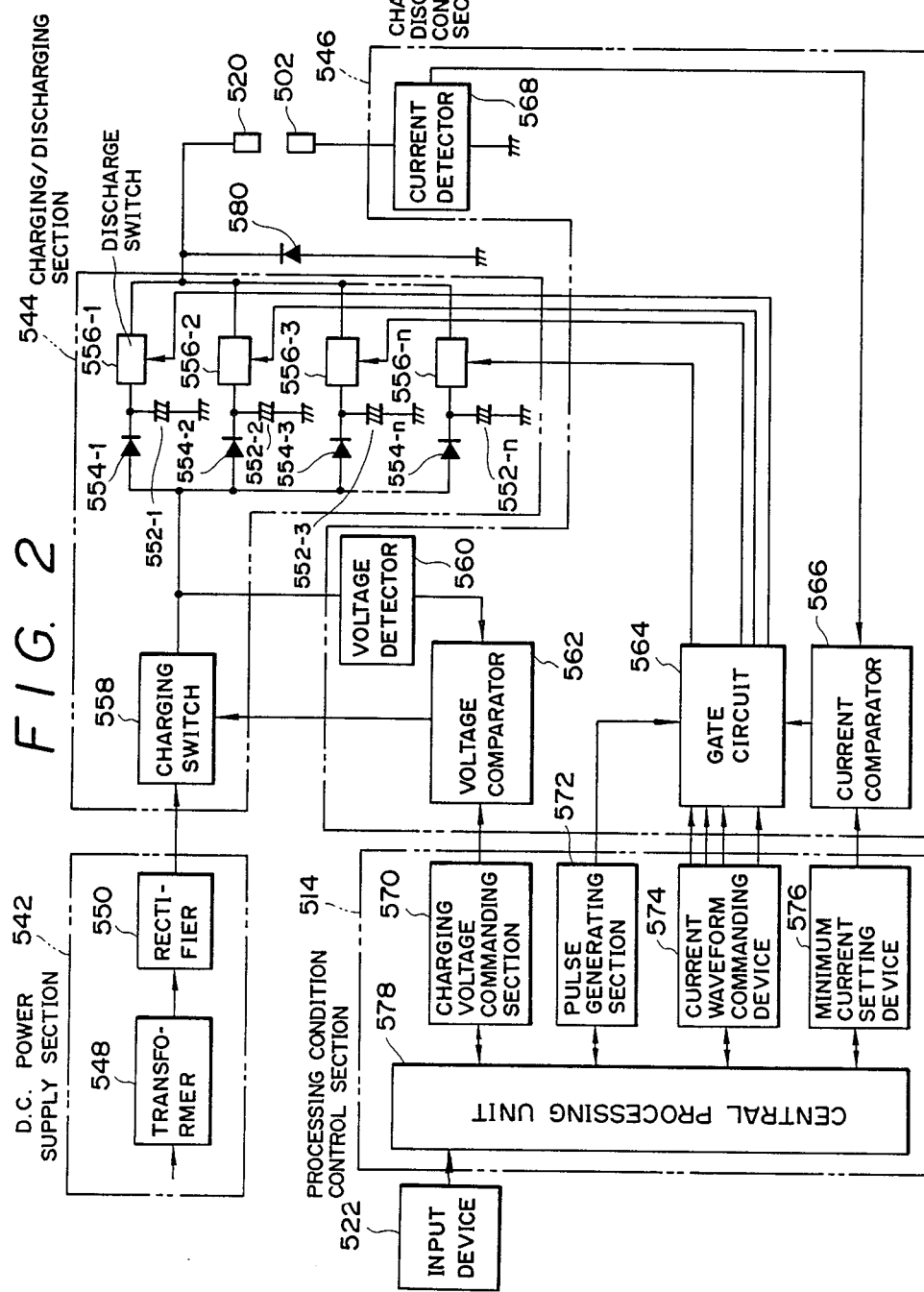
F I G. 2

POWER SUPPLY SYSTEM FOR ELECTROLYTIC PROCESSING APPARATUS

FIELD OF THE INVENTION

The present invention relates to a power supply system for an electrolytic processing apparatus and, more particularly, to a power supply system for an electrolytic processing apparatus capable of supplying pulses of different current densities so as to finish a three-dimensional work surface in a short time and with a high degree of precision, thereby producing a mirror-finished lustre surface.

BACKGROUND OF THE INVENTION

There are two types of electroprocessing systems for electrically processing metals: namely, an electrolytic processing apparatus and an electric discharge processing machine. The first-mentioned apparatus (electrolytic processing apparatus) employs an electrolyte such as sodium nitrate and sodium chloride which fills the gap between a work and an electrode. In operation, the electrolyte is circulated at a high speed and D.C. current is made to flow from the work to the electrode while a suitable measure is taken for removing electrolytic products which would impair the stability of the electrolysis, for example intermetallic compounds, metal ions and hydrogen gas. This type of electrolytic processing apparatus is shown, for example, in Japanese Patent Laid-Open No. 71921/1986 and Japanese Patent Laid-Open No. 44228/1985.

The second-mentioned type of apparatus (electric discharge processing apparatus) employs a bath of a processing liquid such as water, kerosene or the like in which a work is disposed to oppose an electrode with a small gap therebetween. In operation, the work and the electrode are connected to each other so as to cause a momentary sparking discharge or a transient arc discharge between the work and the electrode, thereby processing the work by the energy of the discharge. This type of processing apparatus is shown, for example, in Japanese Patent Publication No. 26646/1985 and Japanese Patent Laid-Open No. 177819/1985.

The known electrolytic processing arrangements in general suffer from the following vital defect. Namely, it is impossible to obtain a uniform flow velocity of the electrolyte through the gap between the electrode and the work when the work has a complicated shape such as a three-dimensional recess with a bottom. In addition, different levels of concentration of the electrolytic products are developed between the inlet and outlet side, even when a large pressure of the electrolyte is applied to the discharge gap. This means that different portions of the discharge gap produce different processing conditions, even if the discharge current is developed uniformly over the whole area of the gap. In consequence, it becomes difficult to precisely transfer the electrode to the work and, hence, to obtain a high precision of the processed work surface.

On the other hand, the electric discharge processing arrangements in general exhibit a comparatively high level of efficiency in the range of fineness of the work surface in terms of roughness (Rmax) of up to 20 μm. For attaining a higher degree of surface fineness, it is necessary to employ a very small processing current of less than 1A. In consequence, the processing time is impractically long, particularly when the work has a large surface to be processed. When the area of the processed surface is large, the electrostatic capacitance between the work surface and the electrode is increased, so that it becomes difficult to delicately control the discharge current, with the result that the desired level of surface fineness is not achieved.

In order to eliminate these problems of the known apparatus, the assignee of the present application has proposed, in Japanese Patent Application No. 27616/1987, an electrolytic finish processing in which the power supply system provides pulses of a low current density in the beginning portion of the finish processing and pulses of a high current density in the later portion of the finish processing. In some cases, pulses of a high current density are intermittently applied to the work surface in order to remove any film. More specifically, a plurality of discharge switches connected between a plurality of capacitors and the work are simultaneously turned on so that electric discharges take place from all the capacitors to develop a predetermined current density of pulses between the electrode and the work.

In this type of electric power supply system, all the capacitors which have large capacitances are made to discharge by the simultaneous closing of all the discharge switches, regardless of whether the pulses are supplied at the low current density or at the high current density. In this system, therefore, a long switching time is required for charging up the capacitors when switching the current density from a low to a high density. In consequence, the processing time is impractically prolonged, and a smooth switching of the pulses is often not achieved.

Accordingly, an object of the present invention is to provide a power supply system for an electrolytic processing apparatus which is capable of efficiently conducting electric discharges from a plurality of capacitors to a work in accordance with the current density of processing pulses to be supplied, so as to finish a complicated surface on the work such as a three-dimensional shape in a sort time and with a high degree of precision, thereby producing a mirror-finished lustre surface.

SUMMARY OF THE INVENTION

According to the invention, there is provided a power supply system for an electrolytic processing apparatus of the type having an electrode which is positioned to oppose a work within an electrolyte, so that the work is processed and finished by the discharge of at least two modes of pulses of different current densities between the work and the electrode. The power supply system includes: a plurality of capacitors capable of discharging charges so as to supply discharge pulses across the work and the electrode, a plurality of discharge switches connected between the capacitors and the work and adapted to selectively cause the charges from the capacitors to be discharged; and a control section for selectively turning the discharge switches on and off in accordance with the current densities.

According to the invention, the number of capacitors employed in the processing is suitably controlled in accordance with the required current densities of the pulses. For example, in the beginning part of the processing intended for improving the fineness of the surface, five discharge switches can be turned on to cause a discharge from five capacitors, then in a subsequent beginning part of the processing specifically intended for removing a surface layer by applying pulses, ten discharge switches different from those used in the beginning part of the processing can be turned on so as to effect a discharge from ten capacitors, and then in the final part of the processing specifically intended for forming a lustre surface with pulses of high current density, all the discharge switches can be turned on to allow all of the capacitors to discharge. In consequence, the capacitors are efficiently utilized so as to shorten the processing time, while smoothing the change-over between different pulse modes.

BRIEF DESCRIPTION OF THE DRAWINGS

Preferred embodiments of the invention will be described in detail hereinafter with reference to the drawings, in which:

FIG. 2 is a schematic block diagram of a power supply system of the electrolytic processing apparatus of FIG. 1;

DETAILED DESCRIPTION

Figure 1:
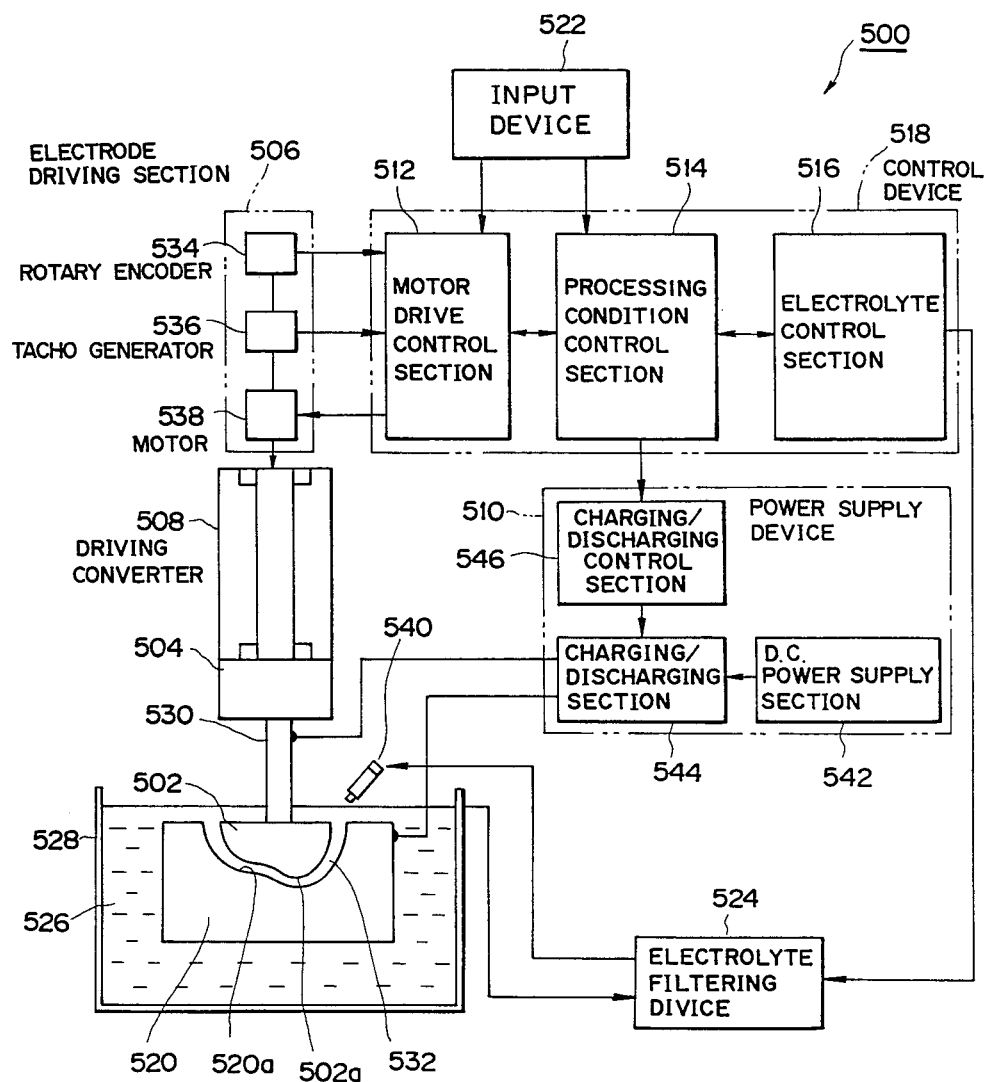
FIG. 1 is a schematic diagram of an electrolytic processing apparatus embodying the present invention.

FIG. 1 to 4 show a first embodiment of the present invention. Referring to FIG. 1, the electrolytic processing apparatus 500 has the following parts: an electrode fixing or supporting device 504 to which an electrode 502 is fixed; a driving converter 508 for converting the rotational movement from an electrode driving section 506 into reciprocal movement; a power supply device 510 for generating pulse current; a control device 518 composed of a motor drive control section 512, a processing condition control section 514 and an electrolyte control section 516; an input device 522 for inputting data concerning the work 520; an electrolyte filtering device 524; and a processing cell 528 accommodating an electrolyte 526.

The electrode fixing device 504 has a rod 530 to the lower end of which is connected the electrode 502, which is made for example of pure copper or graphite and which has an electrode surface 520a which opposes the processed surface 520a of the work 520 with a uniform gap 532 in all three-dimensional directions. The electrode fixing device 504 is movable up and down, in such a manner as to maintain a constant value of the gap 532, by the electrode driving section 506 through the driving converter 508. More specifically, a rotary encoder 534 and a tachogenerator 536 of the electrode driving section 506 produce signals which are delivered to the motor control section 512 of the control device 518 so that a control signal is output from the motor driving control section 512 of the controller 518 so as to rotatingly control the motor 538. The rotational movement produced by the motor 538 is converted into a reciprocatory motion by means of the driving converter portion 508, so that tee electrode fixing device 508 is moved up and down to maintain the constant gap 532 between the electrode surface 502a and the work surface 520a.

The input device 522 is adapted to input signals representing data such as the material and surface area of the work 520, finish margin, the grade of the dimensional precision, surface roughness and the processing electrode gap, and delivers these signals to the motor driving control section 512 and the processing condition control section 514 of the control device 518.

The electrolyte filtering device 524 filters the electrolyte 526 containing electrolytic products produced during the processing. The filtered electrolyte is jetted in accordance with the control signal from the electrolyte control section 516 into the processing cell 528 at a constant liquid pressure. In particular, a solenoid valve 540 and other parts are controlled so as to jet fresh electrolyte 526 into the gap between the work 520 and the electrode 502, thereby removing electrolytic products generated between the work surface 520a and the electrode surface 502a during the processing.

The power supply system 510 is adapted to supply a pulse current of a current density (current value per unit area) of 70A/cm$^2$ or less across the gap between the work 520 and the electrode 502. More specifically, the power supply system 510 is adapted for producing a pulse current of a predetermined density computed in accordance with the surface area of the work, and represented by a control signal from the processing condition control section 514. The power supply unit 510 has a D.C. power supply section 542, a charging/discharging section 544, and a charging/discharging control section 546. An example of the construction of the power supply system 510 is shown in FIGS. 2 and 3.

Referring now to FIG. 2, the D.C. power supply section 542 has a transformer 548 and a rectifier 550. An A.C. current of a voltage reduced by the transformer 548 is supplied to the rectifier 550 which produces a D.C. current delivered to later-mentioned capacitors 552-1 to 552-n. The charging/discharging section 544 includes the capacitors 552-1 to 552-n adapted for causing electric discharge across the gap between the work 520 and the electrode 502, diodes 554-1 to 554-n connected to the capacitors 552-1 to 552-n and adapted for preventing reverse flow of charge from the capacitors to the D.C. power supply portion 542, discharge switches 556-1 to 556-n adapted to be turned on and off to selectively discharge the charges from the capacitors, and a charging switch 562 which is adapted to selectively cut-off the supply of electric current from the D.C. power supply unit 542 so as to charge the capacitors 552-1 to 552-n to a desired level. As shown in FIG. 3 for the discharge switch 556-1, the discharge switches each include five transistors 590-1 to 598-1 and seven resistors 600-1 to 600-7.

The charging/discharging control section 546, which is adapted for controlling the charging/discharging section 544, includes the following parts: a voltage detector 560 for detecting the charging voltage supplied to the capacitors 552-1 to 552-n; a voltage comparator 562 adapted to compare the command charging voltage set by the charging voltage commanding section 570 of the processing condition control section 514 and the charging voltage detected by the voltage detector 560; a current detector 568 composed of two amplifiers 614 and 616 and four resistors 618–624 (FIG. 3) and adapted for detecting the current value resulting from charges discharged across the gap between the work 520 and the electrode 502; a current comparator 566 which is composed of a comparator 626, three resistors 628–632 and three diodes 634–638 and which compares the minimum current value delivered from a D/A converter 584 of the minimum current commanding section 576 and the current value detected by the current detector 568; and a gate circuit 564 which will be explained later.

Figure 3:
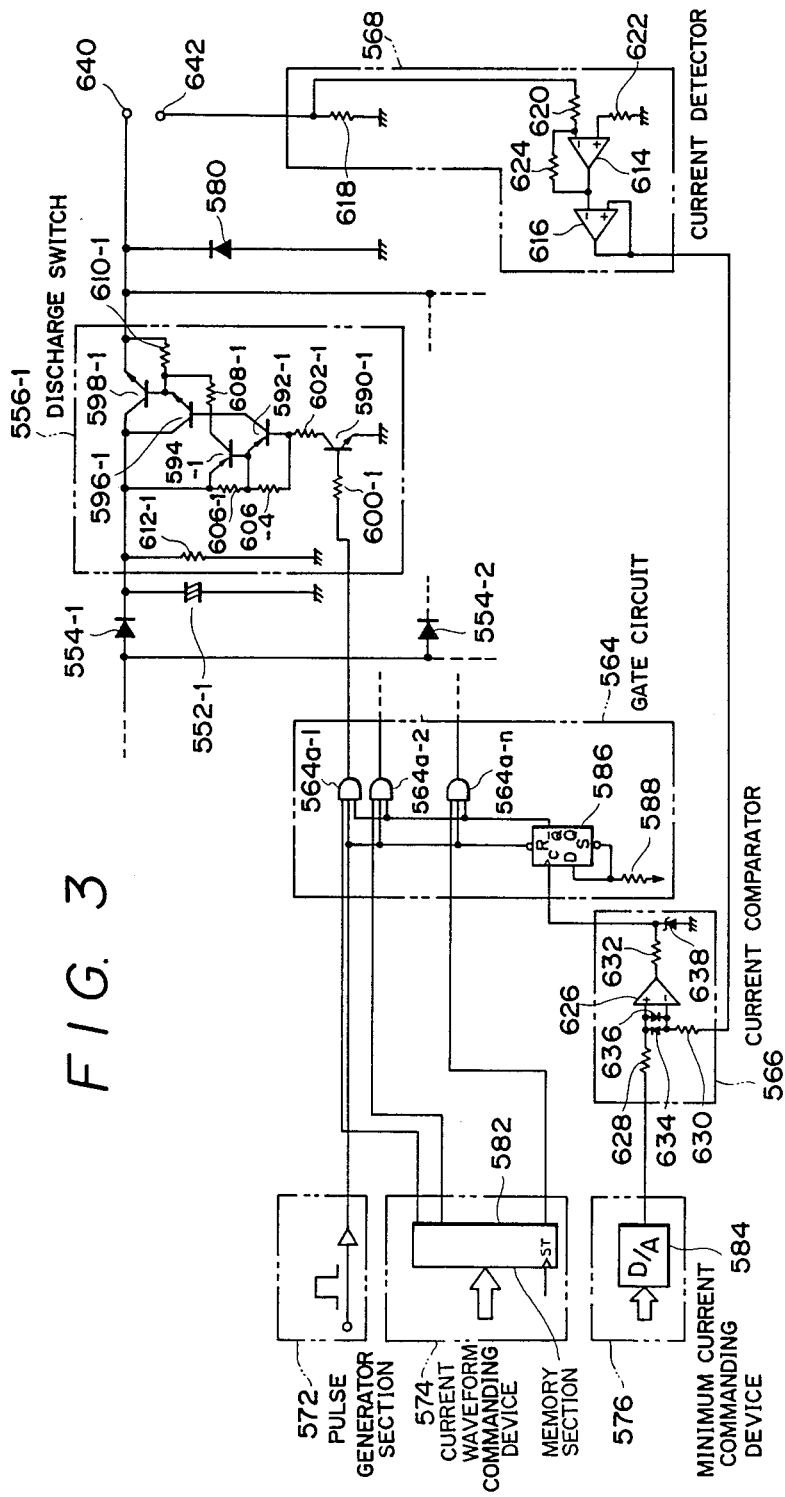
FIG. 3 is a schematic circuit diagram of a portion of the system shown in FIG. 2.

As shown in FIG. 3, the gate circuit 564 is provided with a plurality of three-input AND gates 564a-1 to 564a-n, a D-type flip-flop 586 and a resistor 588 connected to the flip-flop 586. The three inputs of each of the AND gates 564a-1 to 564a-n are respectively connected to the output of the pulse generator 572 of the processing condition control section 514, a respective output of a memory section 582 of the current waveform commanding section 574, and the output of the current comparator 566 through the flip-flop 586. The gate circuit 564 is adapted to deliver opening/closing driving signals to the discharge switches 556-1 to 556-n, in such a manner as to selectively open the AND gates 564a-1 to 564a-n in accordance with a command current density (a current density computed by a later mentioned CPU in accordance with data provided concerning the work 520 through the input device 522), so as to selectively allow the capacitors 552-1 to 552-n to discharge across the gap between the work 520 and the electrode 502 when the detected current value is greater than the minimum current, and to selectively turn off the AND gates 564a-1 to 564a-n so as stop the discharge from the capacitors 552-1 to 552-n when the detected current is below the minimum current. The signals for selectively turning on the AND gates 564a-1 to 564a-n in accordance with the current density may be formed by making use of signals from the waveform commanding section 574 or the pulse generating section 572, or by means of a specific pulse generating section provided in the processing condition control section 514.

The memory section 582 is preferably a conventional latch which is loaded by the CPU, each bit of the latch respectively enabling and disabling the associated input of a respective one of the AND gates 564a-1 to 564a-n when it respectively contains a binary "1" and a binary "0".

The charging/discharging control section 546 is controlled by the processing condition control section 514 of the control device 518. The processing condition control section 514 has, as shown in FIG. 2, a charging voltage commanding section 570, a pulse generating section 572, a current waveform commanding section 574, a minimum current commanding or setting section 576, and a CPU 578 adapted for computing and processing the processing conditions in accordance with the data input through the input device 522. In FIG. 2, reference numeral 580 denotes diodes which are intended for preventing discharge switches 556-1 to 556-n from being broken down by back electromotive force produced when these discharge switches 556-1 to 556-n are opened. In FIG. 3, numerals 640 and 642 denote, respectively, a work terminal and an electrode terminal, which are respectively coupled to the work 520 and electrode 502.

The operation of the electrolytic processing apparatus 500 of this embodiment will be described with reference to a finish processing method.

For the purpose of conducting the finish processing, after data concerning the work 520 is input through the input device 522, a work 520 formed into a desired shape (for example by an electric discharging process) is fixed to the work fixing device which is not shown. At the same time, the same electrode 502 used in the electric discharging process is fixed to the lower end of a rod 530 of the electrode fixing device 504. The electrode 502 is then lowered to bring its surface 502a to a position where it faces the surface 520a of the work 520 to be processed. The electrode 502 and the work 520 thus opposing each other are immersed in an electrolyte 526 contained in the processing cell 528. This position of the electrode 502 is stored as an origin A, and the electrode 502 is raised to a position where a predetermined initial discharge gap is attained. When the gap between the surface 520a to be processed and the electrode surface 502a is filled with the electrolyte 526, the processing is commenced from this position.

In a beginning portion of the finish processing, the power supply system 510 delivers pulses of a predetermined current density (for example 15 A/cm$^2$) computed by the CPU 578 of the processing condition control section 514 to the gap between the work 520 and the electrode 502, for the purpose of improving the fineness of the work surface. For instance, the waveform commanding section 574 of the processing condition control section 514 could deliver control signals which open five AND 564a-1 to 564a-5 so as to effect discharges from five capacitors 552-1 to 552-5 across the gap between the work 520 and the electrode 502. Meanwhile, the other discharge switches 556-6 to 556-n are not turned on, so that the associated capacitors 552-6 to 552-n are maintained in the charged state. As a result, material of the work 502 is removed from the surface 502a. After supplying pulses one or more times, the stationary electrolyte containing electrolytic products in the gap 532 between the work surface 520a and the electrode surface 502a is forcibly removed by actuating the solenoid 540 of the electrolyte filtering device 524 to produce a jet.

After the electrolytic products are removed, the electrode 502 is lowered so that the electrode surface 502a is brought into contact with the surface 520a. Then, the instant position of the electrode is compared with the above-mentioned origin A by the controller 518 so as to measure the processing depth corresponding to one processing cycle (processing by a single pulse or several pulses). Subsequently, the electrode 502 is raised again so as to recover the predetermined gap 534 between the surface of the work piece 520a and the electrode surface 502a, and the gap between the work surface 520a and the electrode surface 502a is filled again with the electrolyte 526 containing no electrolytic product. After the elapse of 1 to 5 seconds from the moment at which the electrode 502 has reached a position where the predetermined gap 532 is formed between the electrode surface 502a and the work surface 520a, pulses are supplied to commence the next processing cycle.

The described finish processing is repeated by a number of times computed by the CPU 578 in accordance with the data input through the input device 522. Then, the CPU 578 delivers a control signal to the current waveform commanding section 574 which enables the power supply system 510 to supply film removing pulses of a density (for example 30 A/cm$^2$) higher than that of the finish processing pulses to the gap between he work 520 and the electrode 502, for example by turning on ten AND gates 564a-6 to 564a-15 so as to enable ten capacitors 552-6 to 552-15 to discharge. These pulses effectively remove a film of the electrolytic products and other matter formed on the processed surface 520a during the preceding processing cycle(s). In this case, the film removing pulses are supplied immediately after the several cycles of processing (finishing by fineness improving pulses). The number of cycles of application of film removing pulses is less than that for the surface finishing pulses. During this processing operation, the capacitors 552-1 to 552-5 which discharged in the preceding operation are charged up.

Thus, in this embodiment, first the gap 532 between the processed surface 520a and the electrode surface 502a is filled with the electrolyte 526 and pulses for improving the fineness of the surface are supplied across the gap between the work 520 and the electrode 502 from five capacitors 552-1 to 552-5, thereby allowing the material of the work 520a to elute into the electrolyte 526. Then, after removing the electrolytic products generated in the gap between the work surface 520a and the electrode surface 502a, the electrode surface 502a is again brought into contact with the work surface 520a so that the processing depth for one processing cycle is measured. The processing depths measured in successive processing cycles are accumulated. When a predetermined number of processing cycles is completed, film removing pulses are supplied from ten charged capacitors 552-6 to 552-15 so as to remove the film on the processed work surface 520a. Meanwhile, the capacitors 552-1 to 552-5 are charged. Then, fresh electrolyte 526 is supplied into the gap 532 between the work surface 520a and the electrode surface 502a, thereby removing film. After elapse of a time interval of 1 to 5 seconds, the flow of the electrolyte 526 is stopped and made still. In this state, the surface fineness improving pulses are applied again to effect the processing. This series of operations is repeated for a predetermined period of time in accordance with the signal from the control device 518.

The accumulated value of the measured processing depths is compared with the command valve of the processing depth which has been computed in the processing condition control section 514 in accordance with the data input through the input device 522. When the difference between the accumulated processing depth and the command processing depth has come down below a predetermined value, for example 1 μm, the CPU 578 delivers a control signal to the waveform commanding section 574. In consequence, the power supply system 510 delivers luster finishing pulses of a current density which is at least 1.5 times as high as that of the surface fineness pulses, for example 60 A/cm$^2$, to the gap between the work 520 and the electrode 502, by turning on all the AND gates 564a-1 to 564a-n of the gate circuit 564 so as to allow all of the capacitors 552-1 to 552-n to discharge. This operation is repeated in the same manner as that described above for a predetermined number of times, which depends on the shape and processing area of the work but is smaller than that for the surface fineness improving pulses, whereby a mirror-finished luster surface is obtained on the work.

As will be understood from the foregoing description, according to the invention the number of capacitors employed is changed in accordance with the current density to be attained. For instance, it is possible to selectively use a plurality of capacitors in such a manner that the pulses of small current density used for improving the surface fineness are provided by discharges from some of these capacitors, while in a subsequent mode in which a higher current density is required for removing a film on the work surface, pulses are supplied by discharges from the capacitors which were not used in the preceding surface fineness improving operation. This means that the switching from the surface fineness improving pulse mode to the film removing pulse mode can be conducted without the delay which otherwise would be required for charging up the capacitors. The same applies also the case where the pulse mode is switched from a mode employing a higher current density to a mode employing a lower current density. Namely, in such a case, it is required only to lower the number of charging voltage capacitors which are used for discharging, so that the length of time required for the switching of the mode is shortened advantageously. Furthermore, in the finishing processing which requires a low current density, the number of capacitors employed is reduced so as to reduce the total electrostatic capacitance of the capacitors, whereby the length of time required for charging up these capacitors is shortened. In consequence, it is possible to shorten the processing time and to smooth the operation for switching between two pulse modes of different current densities.

In the embodiment described above, the number of capacitors used is changed in accordance with the current density to be obtained so as to allow selected capacitors to discharge. The arrangement may be such that the plurality of capacitors are grouped into a plurality of blocks each having a predetermined number of capacitors, and that a discharge switch is provided for each block or for each capacitor of each block. By selectively operating these discharge switches, it is possible to control the discharge operation on the basis of blocks or independent capacitors. In the embodiment described above, the processing condition control section and the charging/discharging control section are arranged independently of each other. This, however, is not exclusive and these sections may be constructed as a unit.

Figure 4:
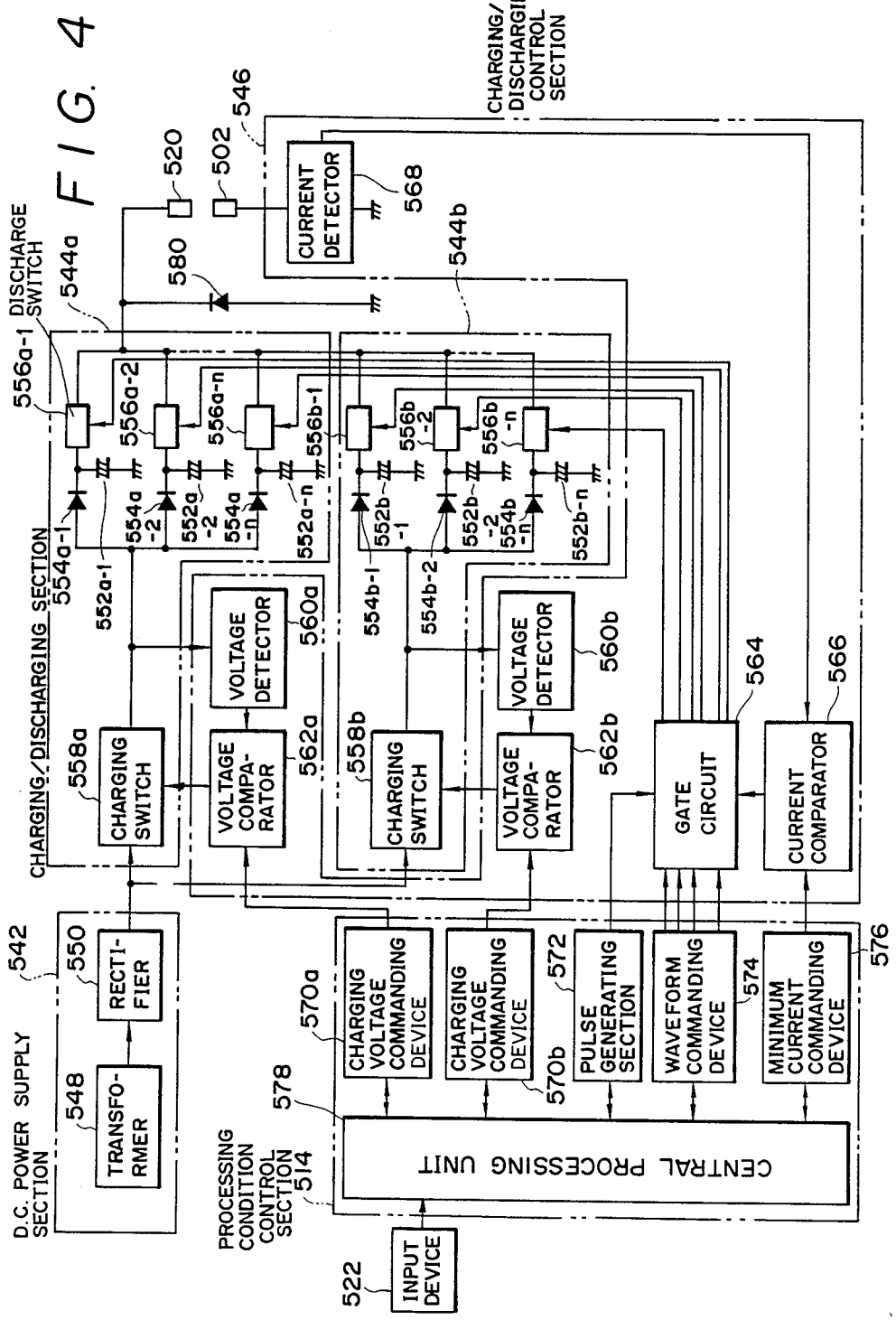
FIG. 4 is a schematic block diagram of an alternative embodiment of the power supply system of FIG. 2.

FIG. 4 shows a modification of the foregoing embodiment. In this FIG., the same reference numerals are used to denote the same parts or members, and a detailed description of such parts or members is omitted. This modification features the use of a pair of charging-/discharging sections 544a and 544b. Pairs of voltage detectors 560a and 560b, voltage comparators 562a and 562b and charging voltage commanding sections 570a and 570b are respectively provided for the pair of charging/discharging sections 544a and 544b.

The charging/discharging section 544a includes a plurality of capacitors 552a-1 to 552a-n, a plurality of diodes 554a-1 to 554a-n for preventing backward flow, a plurality of discharge switches 556a-1 to 556a-n, and a single charging switch 558a. The charging/discharging section 544b has the same construction: namely, it has capacitors 552-b-1 to 552-b-n, diodes 554b-1 to 554b-N, discharge switches 556b-1 to 556b-n, and a charging switch 558b. The discharge sides of all the discharge switches 556a-1 to 556a-n and 556b-1 to 556b-n are connected to the work 520.

The charging/discharging sections 544a and 544b are controlled by the charging/discharging control section 546 and the processing condition control section 514, which together include two voltage detectors 560a and 560b, two voltage comparators 562a and 562b and two charging voltage commanding sections 570a and 570b respectively corresponding to the charging/discharging sections 544a and 544b. The outputs of the gate circuit 564 of the charging/discharging control section 546 are connected to the discharge switches 556a-1 to 556a-n.

The operation of this embodiment is as follows. During the finishing processing which is conducted in the beginning part of the process with pulses of a low current density, the CPU 578 provides a control signal which enables the charging voltage commanding section 570a to set a command charging voltage for attaining the desired low current density. Meanwhile, no value is set by the charging voltage commanding section 570b. The command value from section 570a is compared with the voltage detected by the voltage detector 560a by means of the voltage comparator 562a. In the initial state, the condition of (command voltage)>(detected voltage) is met. As a result, the charging switch 558a is turned on so as to enable the capacitors 552a-1 to 552a-n to be charged. After the charging of the capacitors 552a-1 to 552a-n, the processing condition control section 514 provides a control signal for turning on an AND gate of the gate circuit 564 connected to the discharge switches 556a-1 to 556a-n, thereby allowing the capacitors 552a-1 to 552a-n to discharge. Thus, the supply of the discharge pulses to the gap between the work 520 and the electrode 502 is effected only by one of the two charging/discharging section 544a and 544b when the finishing processing is conducted with pulses of a low current density.

In the case of the finishing processing which is conducted in the later part of the processing with pulses of a higher current density, the capacitors 552a-1 to 552-a-n of the charging/discharging section 544a are charged up in the same manner as that described above. The capacitors 522b-1 to 522b-n of the charging/discharging section 544b are charged up similarly. Then, the processing condition control section 514 produces a control signal which operates to turn on all the AND gates of the gate circuit 564 so that discharges are made from all the capacitors 552a-1 to 552a-n and 552b-1 to 522b-n. Thus, the pulses are supplied from oth of two charging-/discharging sections 544a and 544b in the finish processing which requires pulses of a high current density.

Thus, in this modification, there are two charging-/discharging section 544a and 544b which are provided with a plurality of capacitors 552a-1 to 552a-n and 552b-1 to 552b-n, as well as a plurality of discharge switches 556a-1 to 556a-n and 556-1 to 556b-n, and one or both of these charging/discharging sections can be used at a given time in accordance with control signals from the charging/discharging control section 546 and the processing condition control section 514, depending on the current density of the pulses to be obtained. It is therefore possible to reduce the total electrostatic capacitance of the capacitors 552a-1 to 552a-n and 552b-1 to 552b-n, thus offering the same advantages as that derived from the first-described embodiment.

Although in this modification only two charging/discharging sections each including a plurality of capacitors and discharge switches are used, the modification may be further modified so as to include three or more charging/discharging sections.

As will be understood from the foregoing description, according to the present invention, there is provided a power supply system for an electrolytic processing apparatus of the type having an electrolyte which is positioned to oppose a work within an electrolyte such that the work is processed and finished by discharge of at least two modes of pulses of different current densities between the work and the electrode, the power supply system including: a plurality of capacitors capable of discharging charges so as to supply discharge pulses across the work and the electrode, a plurality of discharge switches connected between the capacitors and the work and adapted to selectively allow the charges from the capacitors to be discharged; and a control section for selectively turning the discharge switches on and off in accordance with the current densities. It is therefore possible to efficiently use the capacitors in accordance with the current density to be attained, so that the charging time and the discharging time can be shortened to shorten the processing time. In addition, switching between two pulse modes of different current densities can be effected smoothly, thus ensuring a good quality of the processed surface.

The embodiments of the invention in which an exclusive property of privilege is claimed are defined as follows:

1. A power supply system for an electrolytic processing apparatus of the type having an electrode which is positioned to oppose a work within an electrolyte such that the work is processed and finished by discharge of pulses of different current densities between the work and the electrode, comprising: a plurality of capacitors capable of discharging charges so as to supply discharge pulses across said work and said electrode, charging means for selectively supplying electric charge to each said capacitor as a function of the voltage currently on the capacitor, a plurality of discharge switches connected between said capacitors and the work and adapted to selectively cause the charges from said capacitors to be discharged; and control section means for simultaneously turning a plurality of said discharge switches on and off in accordance with said current densities; wherein at least two groups of said plurality of said capacitors and at least two groups of said plurality of discharge switches are provided, and wherein said charging means includes means for charging the capacitors of the other said group to a second voltage different from said first voltage.

2. A power supply system for an electrolytic processing apparatus which has a spaced work and electrode disposed in an electrolyte, comprising: a plurality of capacitors arranged in first and second groups; first charging means for storing a first amount of electric charge on each of said capacitors of said first group as a function of the voltage currently thereon; second charging means for storing a second amount of electric charge different from said first amount on each of said capacitors of said second group as a function of the voltage currently thereon; a plurality of electronic discharge switches which each effect and interrupt an electrical connection between a respective said capacitor and the work and electrode; and control means for simultaneously actuating a selected set of said discharge switches to control the transfer of electric charges from said capacitors to the work and the electrode in a manner so that a current of selected density flows between the work and electrode.

3. A power supply system of claim 2, wherein said first charging means includes a selectively actuated first charging switch which can couple a source of electric power to each said capacitor in said first group, a first voltage commanding device for specifying a first voltage, a first voltage detector for detecting the voltage supplied to said capacitors of said first group by said first charging switch, and first voltage comparator means for comparing said first voltage from said first voltage commanding device to said detected voltage from said first voltage detector and for selectively actuating said first charging switch in response to the result of said comparison; and wherein said second charging means includes a selectively actuated second charging switch which can couple a source of electric power to each said capacitor in said second group, a second voltage commanding device for specifying a second voltage different from said first voltage, a second voltage detector for detecting the voltage supplied to said capacitors of said second group by said second charging switch, and second voltage comparator means for comparing said second voltage from said second voltage commanding device to said detected voltage from said second voltage detector and for selectively actuating said second charging switch in response to the result of said comparison.

4. A power supply system of claim 3, wherein said first and second charging means include a central processing unit which controls said first and second voltage commanding devices so as to selectively specify said first and second voltages.

5. A power supply system of claim 4, wherein said first charging means includes a plurality of diodes which each have a cathode connected to a respective said capacitor of said first group and which each have an anode connected to an output of said first charging switch, and wherein said second charging means includes a plurality of diodes which each have a cathode connected to a respective said capacitor of said second group and an anode connected to an output of said second charging switch.

* * * * *

UNITED STATES PATENT AND TRADEMARK OFFICE
CERTIFICATE OF CORRECTION

PATENT NO.   :   4 861 450

DATED        :   August 29, 1989

INVENTOR(S)  :   Teruo ASAOKA et al

It is certified that error appears in the above-identified patent and that said Letters Patent is hereby corrected as shown below:

Column 10, line 32; after "of" insert ---one said group to a first voltage and for charging the capacitors of---.

Signed and Sealed this

Twenty-fifth Day of September, 1990

Attest:

HARRY F. MANBECK, JR.

*Attesting Officer*   *Commissioner of Patents and Trademarks*